United States Patent [19]

Krütz et al.

[11] Patent Number: 4,571,848
[45] Date of Patent: Feb. 25, 1986

[54] APPARATUS FOR MEASURING THE TRANSVERSE PROFILE OF A DRILL HOLE IN A GEOLOGIC FORMATION

[75] Inventors: Ferdinand Krütz; Jürgen Keck, both of Jülich; Johann Bölingen, Aachen; Herbert Wetzler, Brunsum, all of Fed. Rep. of Germany

[73] Assignee: Kernforschungsanlage Jülich Gesellschaft mit beschränkter Haftung, Jülich, Fed. Rep. of Germany

[21] Appl. No.: 691,457

[22] Filed: Jan. 14, 1985

[30] Foreign Application Priority Data

Jan. 12, 1984 [DE] Fed. Rep. of Germany ....... 3400834

[51] Int. Cl.$^4$ ............................................... G01B 7/28
[52] U.S. Cl. ......................................... 33/544; 33/553; 33/178 F
[58] Field of Search ............ 33/178 F, 178 R, 178 E, 33/174 P, 174 L, 169 R, 172 E, 147 K, 174 Q, 542, 543, 544, 553; 73/151

[56] References Cited

U.S. PATENT DOCUMENTS

| | | | |
|---|---|---|---|
| 3,221,413 | 12/1965 | Fesser | 33/174 P |
| 3,939,570 | 2/1976 | Loftus | 33/178 F |
| 4,050,384 | 9/1977 | Chapman | 33/178 F |
| 4,407,071 | 10/1983 | Boeder et al. | 33/178 E |

Primary Examiner—Willis Little
Attorney, Agent, or Firm—Frishauf, Holtz, Goodman & Woodward

[57] ABSTRACT

The telescoping parts of a rotary measuring arm mounted on an axis between two centering devices enable the outer part of the measuring arm, which is equipped with a scanning roller, to be let out or pushed in by the contour of the bore as the arm is swung around by a remote control drive. During such a scan of the bore wall, an inductive or capacitive transducer provides signals representative of the radius measured to a remote location. The three legs of each centering device can be retracted or extended together by the same amount when the measuring device is removed from or set into place in the bore. A drive is also provided for retracting the measuring arm when the apparatus is being moved in the bore.

5 Claims, 1 Drawing Figure

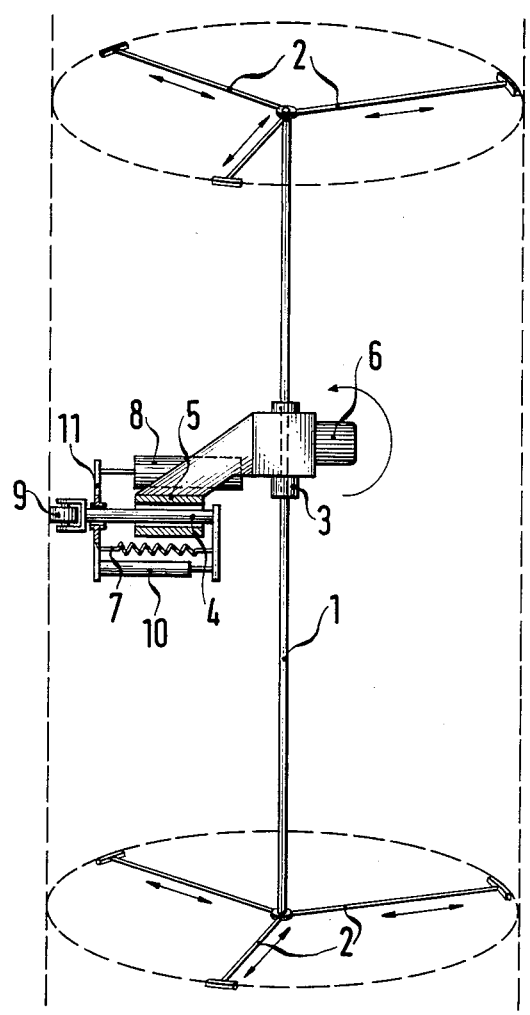

APPARATUS FOR MEASURING THE TRANSVERSE PROFILE OF A DRILL HOLE IN A GEOLOGIC FORMATION

The invention concerns apparatus for measuring a transverse profile of a hole drilled through a geological formation, utilizing two centering devices axially separated from each other by a spacing rod and a measuring arm mounted for rotation about the longitudinal axis of the spacing rod. The arm is radially extendable and retractable and is constituted for applying its extremity against the wall of the bore, with the bore diameter being measurable by inductive or capacitive electric displacement transducers disposed serving for the measuring arm.

It has been found that bore holes made in geological formations in the course of time undergo changes in diameter, including changes which lead to deviation from the cylindrical shape of the hole and thereby also deviations from circular profile. Especially in the large caliber bores in rock salt mines, a gradual change of the profile is observed. The knowledge of the magnitude of this change is of significance for samples or plugs, for example of radioactive wastes, stored in such bores.

It is known in connection with the measurement of bore holes, to insert apparatus equipped with measuring arms which are coupled to inductive or capacitive displacement path transducers or detectors. A device is known particularly from U.S. Pat. No. 4,289,025 which can be used not only for investigations of the position of layers, but also for measuring bore hole diameters. This known apparatus has centering devices, a measuring arm and electrical devices. Furthermore, an apparatus for measuring bore holes is known from U.S. Pat. No. 3,348,314 in which telescoping measuring arms are provided.

SUMMARY OF THE INVENTION

It is an object of the invention to provide an apparatus which will be distinguished from the apparatus known from U.S. Pat. No. 4,298,025 by a particularly compact construction.

Briefly, the measuring arm consists of lengthwise (i.e., radially) disposed parts that are elastically shiftable in a radial direction with respect to each other, and corresponding parts of the inductive or capacitive electrical displacement path transducer are respectively connected directly to the arm parts, so that the mutual relative radial displacement of the latter provide a measure for the bore diameter at that particular place.

For insertion of the apparatus in accordance with the invention, it is lowered into the bore hole and then fixed in place at the location of measurement by means of the centering devices, for which purpose, the centering devices are constituted as three-legged centering devices and provided with an electrical hydraulic or pneumatic drive for extending or retracting the legs of the two three-legged centering devices. It is desirable, furthermore, that the three legs of the centering devices should be connected to each other by a force coupling, so that the legs of the upper centering device will be driven out or retracted by the same amount at the same time, and likewise the legs of the lower centering device, when extended or retracted, will be driven out or retracted by the same amount at the same time.

In order to lower the device into the bore and also to make it possible for the device to pass through narrow places, it is desirable to provide an electrical, hydraulic or pneumatic positioning drive also for the shortening or lengthening of the measuring arm. By means of the latter positioning drive, the measuring arm can be shortened before the lowering of the device into the hole and then extended again at the place of measurement until not it not only touches the wall of the bore, but is applied there with elastically stored force tending to push the arm further outwards.

For determination of the profile, the measuring arm, which has a roller at its extremity facing the bore wall for scanning the latter, is swung around the spacing shaft that holds the centering devices apart. For this purpose, an additional electrical, hydraulic or pneumatic positioning drive is provided. From the radius values obtained from the displacement path transducer, the cross-section of the bore at the place of measurement can be determined.

The measuring signal of the displacement sensor can be used while the measuring arm is in movement for continuously tracing an outline by means of a recording pen, either on a circular chart or on a moving paper strip graduated in degrees in the direction of movement.

In order to carry out digital registration of the measurement results during the circular movement of the measuring arm, it is also convenient for the positioning drive for the swinging of the measuring arm to have predetermined indexed positions into and out of which a measuring arm can be driven in its swinging movement.

BRIEF DESCRIPTION OF THE DRAWINGS

The invention is further described by way of illustrative example with reference to the annexed drawing, the single FIGURE of which is a schematic representation of a measuring apparatus according to the invention, partly in perspective and partly in section.

DESCRIPTION OF THE ILLUSTRATED EMBODIMENT

The apparatus shown in the drawing has two three-legged centering devices 2 spaced from each other by a spacing piece 1. The spacing piece 1 is disposed so as to lie on the central axis of the apparatus.

The legs of the centering devices are variable in length in order to clamp the measuring apparatus at the place of measurement. A force coupling, not shown in the drawing, is provided for forcing outward the three legs of both the centering devices by the same amount, thereby making possible an accurate centering of the three-legged centering guides. The remote operation of that force coupling takes place by means of a pneumatic, hydraulic or electrical drive, likewise not shown in the drawing. One form of suitable force coupling is mechanical gearing requiring all three legs to move together. Another form is a conical vertical cam drive operating against spring pressure.

Between the two centering devices 2, a measuring arm rotatably mounted on the spacing rod 1 in such a way that a positioning motor 6 is usable to swing the measuring arm 4,11 around the spacing rod 1. The showing of the spacing rod is purely diagrammatic, and it is evident that it may be constituted as a tube.

The measuring arm is variable in length and for that purpose is constituted of two essentially radially extending parts 4 and 11, one of which telescopes into the other. The outer radial part 4 is tubular in shape, and it is mounted for radial movement in the cylindrical guide cavity 5 in the inner radial part 11. A spring 7 urges the outer radial part 4 outwards and keeps the roller 9 at the outer extremity of the part 4 against the wall of a bore in which the apparatus is located. The roller 9 serves for scanning the wall of the bore hole. The outer radial part 11 can be moved outwards or inwards by means of the positioning motor 8, as the result of which the outer radial part 4, if it has not already reached the bore wall, will also be moved outwards or inwards, as the case may be. A displacement path transduder 10 is provided having relatively moving parts respectively connected to both of the radial parts 4 and 11 for measuring the relative movement of the two parts in opposite directions, and thus for measuring the change of length of the measuring arm made of these two parts.

For setting up the measuring apparatus of the invention in a bore for measuring the contour of the hole, the apparatus, with the legs of the centering devices drawn short and the measuring arm likewise drawn short, is lowered into the bore, which is typically done with a suspension, not shown in the drawing, connected, for example, to a chain or a cable on which the suspension and the measuring apparatus hang. When the desired distance down the hole has been reached which is desired for the measurement, the lowering is stopped, the legs of the centering devices are driven outwards by the above-mentioned force coupling not shown in the drawings, to hold the apparatus in place, and the measuring arm is extended to the wall by means of the positioning motor 6 until the spring 7 is extended and the arm 4 is about midway in its range of extension into and out of the part 11. Then measurements can be made while the arm is swung around the spacing rod 1.

Although the invention has been described with reference to a particular illustrative embodiment, it will be understood that variations and modifications are possible within the inventive concept.

We claim:

1. Apparatus for determining the profile of bore holes in geological formations comprising:
   two centering devices axially spaced from each other by an elongate spacing member;
   a rotary mount constituted at least in part by said spacing member and having a longitudinal axis running through said spacing member on which said rotary mount is centered which connects the centers of the centering devices;
   a measuring arm held on said rotary mount extending radially from said axis;
   means for controllably moving said measuring arm about said axis, and
   electrical means for measuring the extension length of said measuring arm from said axis to the tip of said arm remote from said axis, said apparatus including the improvement which comprises:
   two parts constituting said measuring arm which are mutually displaceable with respect to each other and an elastic element providing elastic force against which said two parts are mutually displaceable, the direction of said mutual displacement being substantially radial with respect to said axis,
   said respectively displaceable parts (4, 11) of said measuring arm being respectively directly connected to relatively movable parts of said electrical measuring means, whereby an output signal of said electrical measuring means constitutes a measure for the radius of said bore at the location of said measuring arm.

2. Measuring apparatus according to claim 1, in which remotely controlled drive means are provided for shortening or extending the length of said measuring arm.

3. Measuring apparatus according to claim 1, in which a roller is provided at the tip of said measuring arm remote from said rotary mount, for circumferentially scanning the wall of the bore in which the apparatus is located.

4. Measuring apparatus according to claim 2, in which means are also provided for remotely controlling said means for controllably moving said measuring arm about said axis on said rotary mount.

5. Measuring apparatus according to claim 4, in which indexing means are provided for a plurality of indexed positions of said measuring arm, into and out of which said measuring arm may be driven by said means for moving said measuring arm about said axis, said indexed positions serving for orientation correlation of discrete measurements.

* * * * *

UNITED STATES PATENT AND TRADEMARK OFFICE
CERTIFICATE OF CORRECTION

PATENT NO. : 4,571,848

DATED : February 25, 1986

INVENTOR(S) : Ferdinand Kreutz et al.

It is certified that error appears in the above-identified patent and that said Letters Patent is hereby corrected as shown below:

On the title page Item (19), "Krütz et al" should read -- Kreutz et al --.

On the title page, first inventor's name should -- Ferdinand Kreutz --.

Signed and Sealed this

Sixth Day of January, 1987

Attest:

DONALD J. QUIGG

*Attesting Officer*  *Commissioner of Patents and Trademarks*